United States Patent
Viaud et al.

(10) Patent No.: US 7,694,504 B1
(45) Date of Patent: Apr. 13, 2010

(54) SECONDARY FEEDER ROTOR BEHIND UNDERSHOT PRECUTTER

(75) Inventors: Jean Viaud, Gray (FR); Henry D. Anstey, Ottumwa, IA (US); Daniel E. Derscheid, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/237,002

(22) Filed: Sep. 24, 2008

(51) Int. Cl.
  *A01D 39/00* (2006.01)
  *A01D 43/02* (2006.01)
  *A01D 75/00* (2006.01)

(52) U.S. Cl. ........................................ 56/341

(58) Field of Classification Search ............... 56/341, 56/344; 100/88, 87
See application file for complete search history.

(56) References Cited

U.S. PATENT DOCUMENTS

| | | | |
|---|---|---|---|
| 5,519,990 A | 5/1996 | Rodewald et al. | |
| 5,595,055 A * | 1/1997 | Horchler et al. | 56/341 |
| 5,819,515 A * | 10/1998 | Ratzlaff et al. | 56/341 |
| 5,848,523 A * | 12/1998 | Engel et al. | 56/341 |
| 6,029,434 A * | 2/2000 | Ratzlaff et al. | 56/341 |
| 6,298,646 B1 * | 10/2001 | Schrag et al. | 56/341 |
| 6,370,851 B1 * | 4/2002 | Uros et al. | 56/10.2 R |
| 6,536,337 B2 | 3/2003 | Huchet et al. | |
| 6,557,336 B2 * | 5/2003 | Lucand et al. | 56/341 |
| 6,595,123 B2 * | 7/2003 | Schrag et al. | 100/97 |
| 6,651,418 B1 * | 11/2003 | McClure et al. | 56/341 |
| 6,679,040 B2 * | 1/2004 | Lucand et al. | 56/341 |
| 6,679,042 B1 * | 1/2004 | Schrag et al. | 56/341 |
| 6,681,552 B2 * | 1/2004 | Nelson et al. | 56/11.2 |
| 6,769,239 B1 * | 8/2004 | Webb | 56/341 |
| 6,874,311 B2 * | 4/2005 | Lucand et al. | 56/341 |
| 6,910,325 B2 | 6/2005 | Viaud | |
| 7,124,568 B2 * | 10/2006 | Hotaling | 56/341 |
| 7,252,587 B2 * | 8/2007 | Viaud | 460/109 |
| 7,275,360 B2 * | 10/2007 | Viaud | 56/341 |
| 7,311,040 B2 * | 12/2007 | Viaud | 100/87 |
| 7,404,283 B2 * | 7/2008 | Viaud | 56/228 |
| 7,584,594 B2 * | 9/2009 | Viaud | 56/364 |

FOREIGN PATENT DOCUMENTS

| | | | |
|---|---|---|---|
| DE | 19806630 A1 * | 8/1999 | |
| DE | 19913030 A1 * | 9/2000 | |
| EP | 1306003 A1 * | 5/2003 | |

* cited by examiner

*Primary Examiner*—Árpád Fábián-Kovács

(57) ABSTRACT

A round baler has an overshot secondary rotor located behind an undershot precutter rotor. The round baler has a relatively wide swath crop pick-up and a baling chamber with a significantly more narrow inlet. The precutter rotor has a central region supporting a plurality of rotatable crop conveying members interleaved by both a set of relatively fixed cutting blades and a set of relatively fixed strippers for urging cut crop away from the rotor, and end regions supporting rotatable helically disposed bands for receiving wide swath crop from the pick-up arrangement and urging the received crop toward the central region. The secondary rotor creates an S-shaped or serpentine crop path with minimal dead space and is a positive feeder for bale starting. Stationary strippers for the secondary rotor prevent crop from exiting the baler behind the secondary rotor.

15 Claims, 3 Drawing Sheets

SECONDARY FEEDER ROTOR BEHIND UNDERSHOT PRECUTTER

FIELD OF THE INVENTION

The present invention relates to agricultural harvesters and more particularly to a crop pick-up and baling machine.

BACKGROUND OF THE INVENTION

Large generally cylindrical rolls of hay or similar crop material are familiar late summer sights in farm fields. Such bales are typically formed by a tractor drawn harvesting machine including near its leading edge a pick-up device in the form of a rotor having a plurality of outwardly extending tines. Rotor rotation serves to pick the crop upwardly over the rotor and rearwardly (opposite the longitudinal direction of harvester travel) for further processing. A comb-like array of fixed elements strip the crop from the tines at an appropriate location to prevent the crop from being returned to the ground. A pick-up or take-up device with a wide swath is desirable to minimize the number of harvester passes necessary to clear a field, however, directly feeding the crop from such a wide swath to a baling chamber would result in an inordinately long and difficult to handle cylindrical roll. Some type of converging arrangement for narrowing the width of the crop entering the baling chamber is typically employed to avoid this problem.

Known large round balers and rectangular balers receive the crop to be baled from a take-up device of great width that delivers it to a transverse conveyor, such as a screw conveyor, that conducts it in turn selectively into a cutter head from which it reaches a baling chamber. In these balers, condensed and compressed crop to be baled can bring about jams in the cutter head. An example of such a baler is disclosed in DE 198 06 630.

An undershot precutter rotor (crop passing beneath the rotor) feeding an overshot floor rotor has become an industry standard. The floor rotor with raised bars welded to the tube provides a passive counter-rotation to the bale to aid in the bale starting to roll its core. Since the floor roller is not a positive feeder of crop, poor bale starting remains a problem. Significant crop loss often occurs behind the floor roller in front of the belts of the lower gate roller.

In U.S. Pat. No. 6,910,325 B2 there is disclosed a large round baler equipped with a plurality of components for delivering crop to an inlet of a baling chamber of the large round baler. These components have a width which is substantially wider than the baling chamber inlet and include a crop take-up device and a crop processing arrangement, such as a cutter head, that receives crop from the crop take-up device. The crop processing arrangement delivers the processed crop to a transverse conveyor, which narrows the stream of crop to the width of the baling chamber inlet.

SUMMARY OF THE INVENTION

The invention in one form is directed to a crop delivery arrangement for picking up crop and transporting it to the inlet of a baling chamber and includes a crop take-up device for taking up crop and delivering it in a rearward direction to a crop processing arrangement including an undershot precutter rotor located for receiving the crop from the crop take-up device and for delivering the crop in the rearward direction. The crop take-up device is considerably wider than either the crop processing arrangement or the inlet. There is a transverse conveyor located for receiving the crop from the take-up device, converging the crop width, and delivering the crop to the precutter rotor. An overshot secondary feed rotor located downstream of the precutter rotor conveys the narrowed precut crop to the baling chamber.

The invention in another form is directed to a harvesting machine for retrieving crop from a field including a pick-up for raising a relatively wide swath of crop from the surface of the field and conveying the raised crop in a downstream direction to a crop processing region. The crop processing region includes an undershot precutter rotor and a swath narrowing arrangement for supplying a reduced width swath of crop to the precutter rotor. There is an overshot secondary feed rotor downstream of the precutter rotor for conveying the narrowed precut crop to the baling chamber.

In a still further form, the invention is directed to a combination crop cutting and crop conveying assembly for use in an agricultural harvesting machine having a relatively wide swath crop pick-up arrangement for retrieving crop from a field and a baling chamber having an inlet significantly more narrow than the pick-up swath. A generally cylindrical rotor shaft supports a plurality of rotatable crop conveying members. There is a set of relatively fixed cutting blades interleaved with the conveying members for cutting crop as it is conveyed and a set of relatively fixed strippers interleaved with the conveying members for urging cut crop away from the members. An overshot feed rotor receives cut crop from the strippers and conveys the cut crop to the baling chamber inlet.

DETAILED DESCRIPTION OF THE INVENTION

Figure 1:
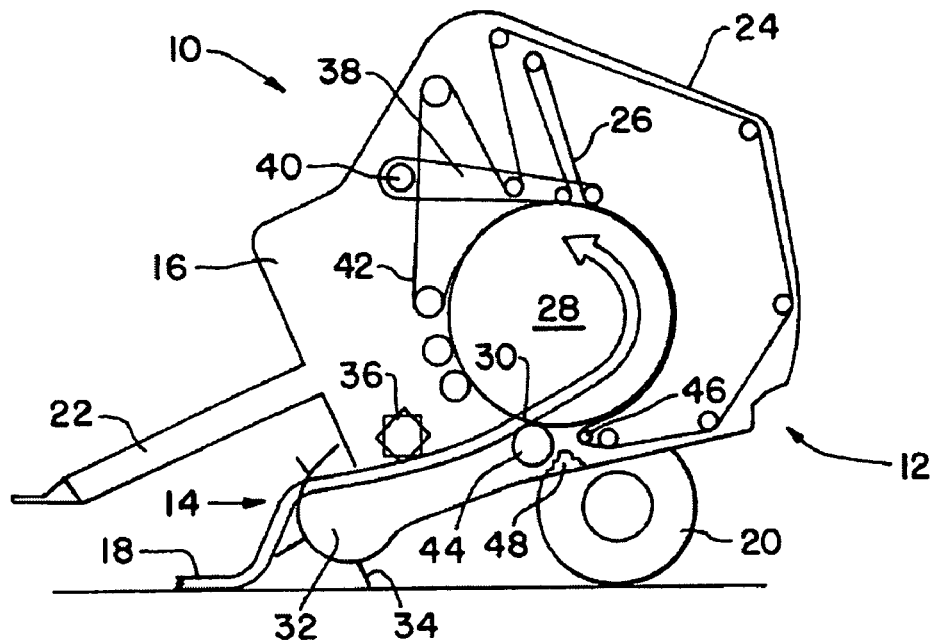
FIG. 1 is a schematic left side elevation view of an illustrative prior art large round baler.

Referring now to FIG. 1, there is shown a baler 10 of known design having a chassis 12 and a crop supply assembly 14. The baler 10 is configured as a large round baler. The baler 10 is applied on the field and takes up crop 18 deposited on the ground in wide swaths, in order to subject it to a baling process. In the case of a large round baler, a configuration with a baling chamber of fixed size as well as a chamber of variable size can be considered. The chassis 12 includes a frame 16 supported on wheels 20, a towbar 22, side walls 24 and a baling arrangement 26. An axle forms the connection between the wheels 20 and the frame 16 and can be attached or configured as spring-supported or rigidly. The wheels support the frame 16 on the ground so that it can move freely and be drawn across the field by the tow bar 22 due to its connection with a towing vehicle. The side walls 24 are spaced away from each other by the width of, and define opposite sides of, the baling chamber 28. The baling arrangement 26 may consist of belts, pulleys, bar chains or the like, and is used to take up the crop to be baled and conducted in the baling chamber 28 and to compress it. An inlet 30 into the baling chamber 28 is provided at the forward lower end region of the baling arrangement 26. The supply assembly 14 is composed of components that are located upstream of the inlet 30 and includes a take-up device 32. As crop is fed in, the bale expands and arm 38 pivots about 40 correspondingly increasing the portion of belt 42 surrounding the bale. The take-up device 32 is generally characterized as a pick-up and is provided with tines 34 that raise the crop 18 to be baled from the ground and deliver it to the rear to the crop processing arrangement 36. The floor roller 44 is a tube with raised bars welded to its surface and provides a passive counter-rotation to the bale. The floor roller 44 is not a feeder of crop and significant crop loss may occur behind the floor roller 44 in front of the lower gate roller 46 as indicated at 48. More positive bale starting and less crop loss may be achieved as described in conjunction with FIGS. 2-5.

Figure 2:
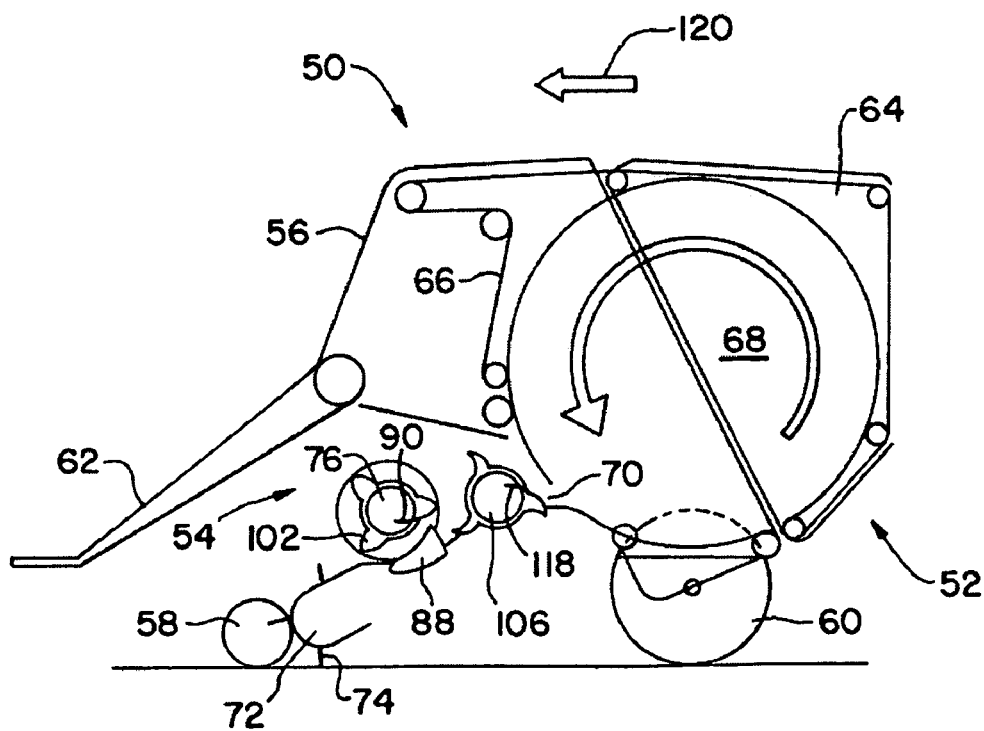
FIG. 2 is a schematic left side elevation view of a large round baler according to the present invention.
Figure 3:
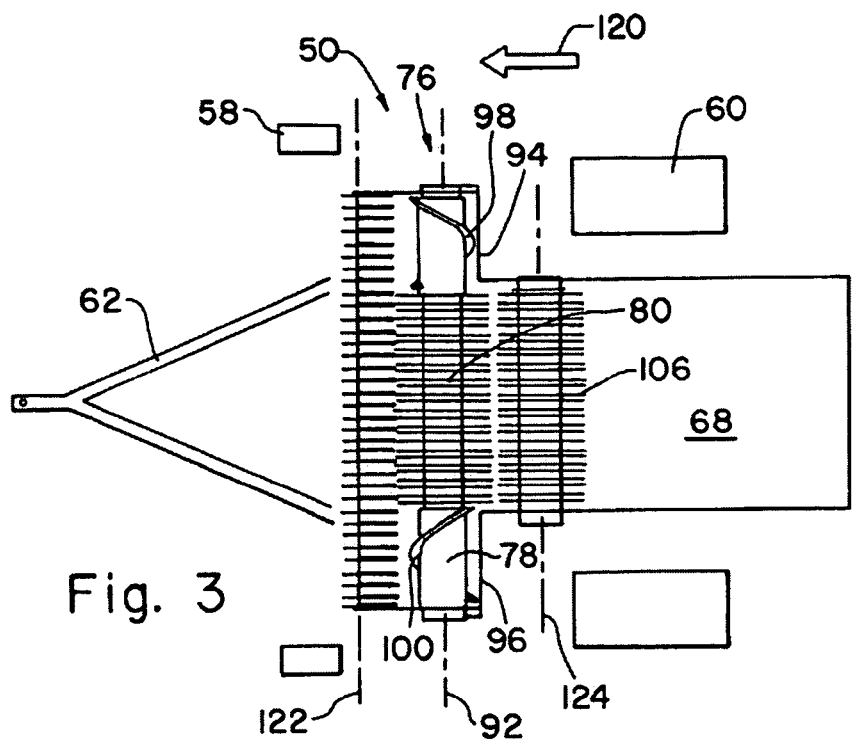
FIG. 3 is a top plan view of the baler of FIG. 2.

In FIGS. 2 and 3, a large round baler 50 shares many features with FIG. 1. The baler includes chassis 52 and a crop supply assembly 54. The chassis 52 includes a frame 56 supported on wheels 60, a towbar 62, side walls 64 and a baling arrangement 66. An axle forms the connection between the wheels 60 and the frame. The wheels support the frame 56 on the ground so that it can move freely and be drawn across the field by the tow bar 62 due to its connection with a towing vehicle. The side walls 64 are spaced away from each other by the width of, and define opposite sides of, the baling chamber 68. An inlet 70 into the baling chamber 68 is provided at the forward lower end region of the baling arrangement 66. The supply assembly 54 is composed of components that are located upstream of the inlet 70 and includes a take-up device 72. The take-up device 72 is generally characterized as a pick-up and is provided with tines 74 that raise the crop to be baled from the ground and deliver it to the rear. An additional set of wheels 58 function as gauge wheels pivoting the front portion to maintain the spacing between the take-up device 72 and the ground at a preferred value. The crop processing arrangement differs markedly from those discussed in conjunction with FIG. 1.

Figure 5:
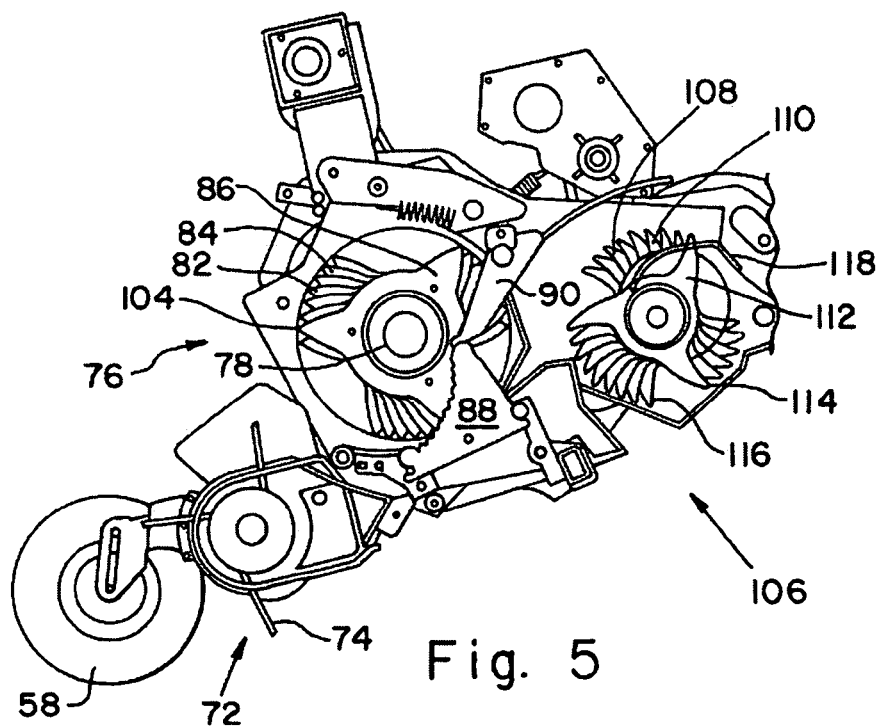
FIG. 5 is a cross-sectional view along lines 5-5 of FIG. 4.
Figure 4:
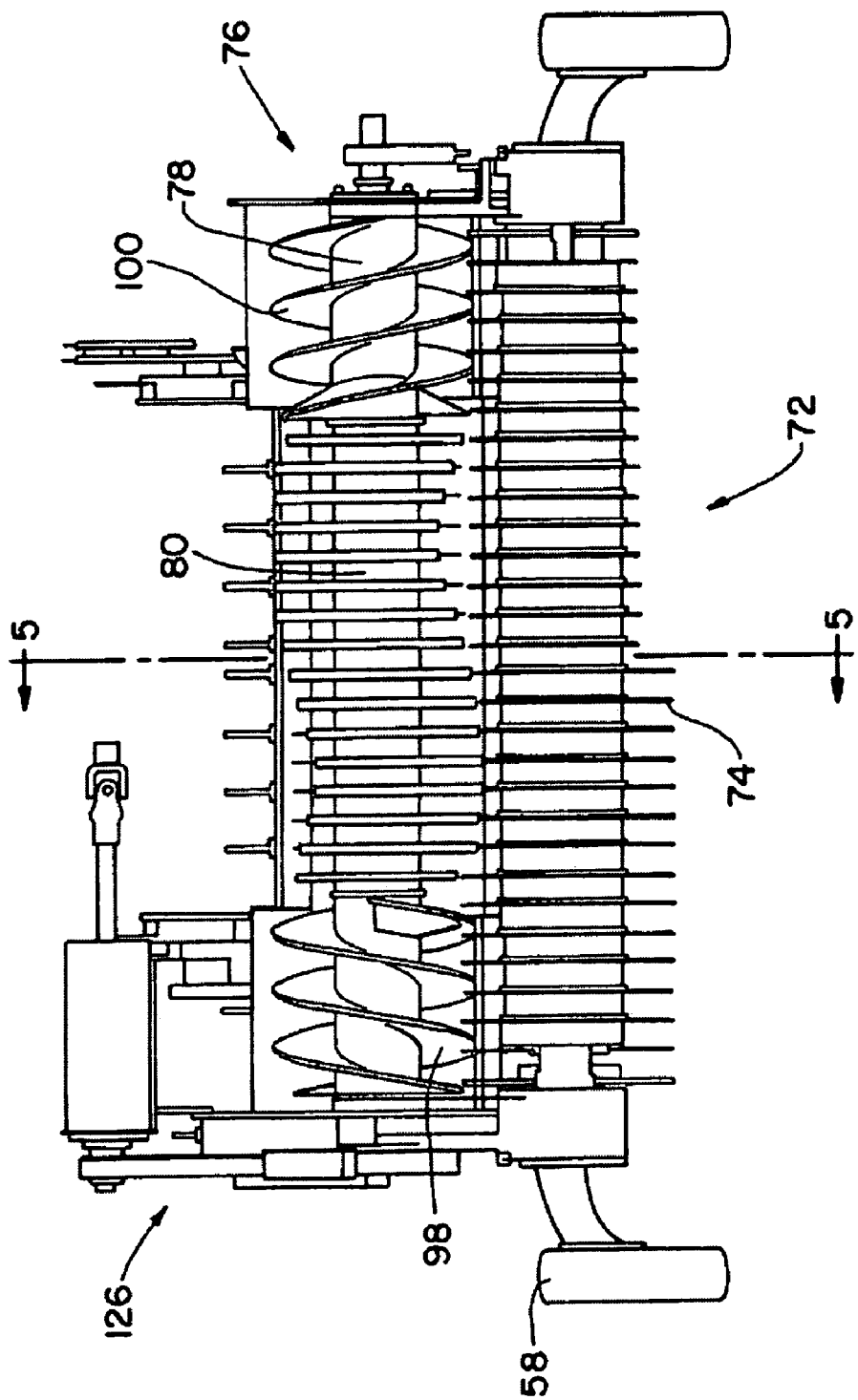
FIG. 4 is a more detailed front elevation view of the crop feed portion of the baler of FIGS. 2 and 3.

Crop which has been lifted from the ground and passed over the pick-up device 72 is presented to a rotor assembly configured as an undershot combination precutter and transverse conveyor 76 which functions to both cut and transversely converge the crop to a more narrow width. A generally cylindrical rotor core or shaft 78 has a central region 80 supporting a plurality of rotatable crop conveying members such as 82, 84 and 86 (FIG. 5). There is a set of relatively fixed cutting blades or knives 88 interleaved (e.g., one blade between each adjacent pair of conveying members) with the conveying members for cutting crop as it is conveyed followed downstream by a set of relatively fixed strippers 90 also interleaved with the conveying members for urging cut crop away from the members. The strippers 90 may take the form of a rake or comb-like assembly for dislodging crop from the crop conveying members. As is particularly apparent in FIGS. 3, 4 and 5, the crop conveying members such as 82, 84 and 86 are configured as a plurality of generally parallel plates each having a number of outwardly protruding crop engaging fingers 102 or 104.

The combination precutter and transverse conveyor includes outboard of the central region 80 a pair of rotor end regions each supporting a rotatable helically disposed band 98 or 100 for receiving wide swath crop from the pick-up arrangement 72 and urging received crop in the direction of shaft 78 axis 92 toward the central region. The two helically disposed bands 98 and 100 are wound about the rotor in opposite senses so as to urge crop toward the central region during shaft rotation. A shroud 94 or 96 may partially surround the helically disposed band to confine the received uncut crop to generally axial motion toward the central region. This central region 80 is of approximately the same width as the baling chamber inlet 70, however, the take-up width (width of the pick-up arrangement 72) significantly exceeds the width of the central region and baling chamber. This is particularly apparent in FIGS. 3 and 4.

The functions of the combination precutter and transverse conveyor may be separated by employing any suitable crop width converging system upstream of the precutter. For example, a converging auger arrangement such as cantilevered or stub augers may be employed.

An overshot secondary feed rotor 106 is located downstream or rearward of the precutter rotor assembly 76 for conveying the narrowed precut crop to the baling chamber 68. Rotor 106 (FIGS. 2, 3 and 5) creates an S-shaped or serpentine crop path and is a positive feeder for bale starting. As best seen in FIG. 5, the secondary feed rotor 106 includes a set of rotating crop conveying members in the form of generally parallel plates 108, 110, 112 each having a number of outwardly protruding crop engaging fingers such as 114 and 116 interleaved with strippers 118 for conveying cut crop away from the blades and into the baling chamber inlet 70. The precutter and secondary feed rotor along with the associated blades and strippers function as a crop cutting and conveying assembly.

The mode of operation of the invention should now be clear. Baler 50 is drawn in the direction of arrow 120 by a tractor which also supplies power by way of hydraulic lines or other conventional schemes to drive the shafts of the pick-up 72, precutter rotor assembly 76 and secondary rotor 106. The peripheral feed speeds of these three units may be selected or controlled to avoid the accumulation of crop at undesirable locations. The drive mechanism is indicated generally at 126 in FIG. 4. These shafts rotate about respective axes 122, 92 and 124. The axes are pairwise parallel, that is, any two of these axes are generally parallel to one another, and each is generally parallel to the ground. The pick-up 72 and precutter rotor 76 are counter-rotating with the pick-up rotating in a clockwise direction as viewed in FIGS. 2 and 5 while the precutter rotor revolves in a counterclockwise (undershot) direction. The precutter rotor and secondary feed rotor 106 are also counter-rotating since the secondary feed rotor rotates about axis 124 in a clockwise direction as viewed in FIGS. 2 and 5. Pick-up 72 raises a swath of crop which passes over the pick-up and then beneath the precutter rotor assembly 76. As the central portion of the conveyed crop passes under the rotor, it first encounters the cutter blades 88 and later is dislodged from the rotor by strippers 90. The edge portions of the crop swath encounter the outboard helical portions and are converged to also pass under the cutter blades. The crop, now of much reduced width is drawn by the secondary rotor 106 into the baler inlet 70. The baler chamber operates in known fashion to produce the large round bales.

Having described the preferred embodiment, it will become apparent that various modifications can be made without departing from the scope of the invention as defined in the accompanying claims.

What is claimed is:

1. In combination with a baler including a baling chamber having an inlet, a crop delivery arrangement for picking up crop and transporting it to the baling chamber, comprising:
   a crop take-up device considerably wider than the baling chamber, for taking up crop and delivering it in a rearward direction;
   a crop processing arrangement including an undershot precutter rotor for cutting crop, said processing arrangement located for receiving the crop from the crop take-up device, converging the crop to nearly the bale width and delivering the crop in said rearward direction, the undershot precutter rotor having a central region having a set of rotating crop conveying members interleaved with cutting blades for cutting crop and further interleaved with strippers for conveying cut crop away from the blades, and the swath narrowing arrangement includes at least one converging region outboard of the cutter for urging crop laterally toward the cutting blades; and an overshot feed rotor rearward of the crop processing arrangement for conveying the cut crop to the baling chamber inlet.

2. The crop delivery arrangement of claim 1, wherein the overshot feed rotor includes a set of rotating crop conveying members interleaved with strippers for conveying cut crop away from the blades and into the inlet.

3. The crop delivery arrangement of claim 2, wherein the set of rotating crop conveying members comprise a plurality of generally parallel plates each having a number of outwardly protruding crop engaging fingers.

4. A harvesting machine for retrieving crop from a field including a pick-up for raising a relatively wide swath of crop from the surface of the field and conveying the raised crop in a downstream direction to a crop processing region and subsequent baling chamber, comprising:

an undershot precutter rotor having a central region having a set of rotating crop conveying members interleaved with cutting blades for cutting crop and further interleaved with strippers for conveying cut crop away from the blades, and the swath narrowing arrangement includes at least one converging region outboard of the cutter for urging crop laterally toward the cutting blades;

a swath narrowing arrangement for supplying a reduced width swath of crop to the precutter rotor; and an overshot secondary feed rotor downstream of the precutter rotor for conveying the narrowed precut crop to the baling chamber.

5. The harvesting machine of claim 4, wherein the pick-up, the precutter rotor and the secondary feed rotor are rotatable about axes of rotation which are generally pairwise parallel.

6. The harvesting machine of claim 5, wherein the pick-up and precutter rotor are counter-rotating.

7. The harvesting machine of claim 5, wherein the precutter rotor and secondary feed rotor are counter-rotating.

8. The harvesting machine of claim 4, wherein the overshot secondary feed rotor includes a set of rotating crop conveying members interleaved with strippers for conveying cut crop away from the blades and into the inlet.

9. The harvesting machine of claim 8, wherein the set of rotating crop conveying members comprise a plurality of generally parallel plates each having a number of outwardly protruding crop engaging fingers.

10. The harvesting machine of claim 4, wherein said swath narrowing arrangement includes at least one end section of the pre-cutter rotor configured as a screw conveyor.

11. A combination crop cutting and crop conveying assembly for use in an agricultural harvesting machine having a crop pick-up arrangement for retrieving crop from a field and a crop baling chamber having an inlet, the assembly comprising:

a generally cylindrical rotor shaft supporting a first plurality of rotatable crop conveying members;

a set of relatively fixed cutting blades interleaved with the conveying members for cutting crop as it is conveyed;

a first set of relatively fixed strippers interleaved with the conveying members for urging cut crop away from the members; and an overshot feed rotor receiving cut crop from the strippers and conveying the cut crop to the baling chamber inlet, the overshot feed rotor having a second plurality of rotating crop conveying members interleaved with a second set of relatively fixed strippers for conveying cut crop away from the second set and into the inlet.

12. The combination crop cutting and crop conveying assembly of claim 11, wherein the first plurality of rotatable crop conveying members and the second plurality of rotatable crop conveying members are counter-rotating.

13. The combination crop cutting and crop conveying assembly of claim 11, wherein the second set of crop conveying members comprise a plurality of generally parallel plates each having a number of outwardly protruding crop engaging fingers.

14. The combination crop cutting and crop conveying assembly of claim 11, wherein the first plurality of crop conveying members comprise a plurality of generally parallel plates each having a number of outwardly protruding crop engaging fingers.

15. The combination crop cutting and crop conveying assembly of claim 11, wherein crop is conveyed in a downstream direction and the set of cutting blades is disposed upstream of the set of strippers.

* * * * *